(12) United States Patent
Zhang et al.

(10) Patent No.: US 9,020,212 B2
(45) Date of Patent: Apr. 28, 2015

(54) AUTOMATICALLY DETERMINING A NAME OF A PERSON APPEARING IN AN IMAGE

(75) Inventors: Tong Zhang, San Jose, CA (US); Georgia Koutrika, Santa Clara, CA (US); Eamonn O'Brien-Strain, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 13/562,565

(22) Filed: Jul. 31, 2012

(65) Prior Publication Data

US 2014/0037154 A1 Feb. 6, 2014

(51) Int. Cl.
*G06K 9/00* (2006.01)

(52) U.S. Cl.
CPC .................................. *G06K 9/00677* (2013.01)

(58) Field of Classification Search
USPC ........................... 382/118, 155, 181; 707/755
See application file for complete search history.

(56) References Cited

U.S. PATENT DOCUMENTS

| | | | |
|---|---|---|---|
| 7,849,093 B2* | 12/2010 | Farago et al. ................. 707/755 |
| 8,031,914 B2* | 10/2011 | Zhang ............................ 382/118 |
| 8,750,574 B2* | 6/2014 | Ganong et al. ................ 382/115 |
| 8,761,462 B2* | 6/2014 | Sun et al. ...................... 382/118 |
| 2007/0088678 A1* | 4/2007 | Farago et al. ..................... 707/3 |
| 2008/0089561 A1* | 4/2008 | Zhang ............................ 382/118 |
| 2009/0094210 A1* | 4/2009 | Reinhardt et al. ................ 707/3 |
| 2014/0037154 A1* | 2/2014 | Zhang et al. .................. 382/118 |

OTHER PUBLICATIONS

Deschacht, K et al, "Text Analysis for Automatic Image Annotation", Jun. 2007, pp. 1000-1007, retrieved on <http://acl.ldc.upenn.edu/P/P07/P07-1126.pdf>.
T. Zhang, J. Xiao, et al., "Face Based Image Navigation and Search," ACM Conference on Multimedia, Beijing, Oct. 2009, 4 pgs.

* cited by examiner

*Primary Examiner* — Gregory M Desire
(74) *Attorney, Agent, or Firm* — Dicke, Billig & Czaja

(57) ABSTRACT

A computer-implemented method of automatically determining a name of a person appearing in an image includes receiving a collection of web pages containing a plurality of images. For each of the images, a set of names associated with the image is identified based on a text analysis of at least one of the web pages. Face detection and clustering is performed on the plurality of images to generate a plurality of face clusters. For each of the face clusters, a label for the face cluster is identified based on the set of names associated with each image in the face cluster. A name of a first person appearing in at least one of the images is determined based on the identified label for one of the face clusters associated with the first person.

20 Claims, 3 Drawing Sheets

AUTOMATICALLY DETERMINING A NAME OF A PERSON APPEARING IN AN IMAGE

BACKGROUND

Face recognition and clustering techniques may be used to automatically group images into clusters, with each cluster containing photos of the same person. Text processing techniques may be used for analyzing the text near an image in order to automatically identify certain text information associated with images or elements within the images.

DETAILED DESCRIPTION

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples of the present disclosure can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Face recognition and clustering techniques may be used to automatically group images into clusters, with each cluster containing photos of the same person. Since such techniques typically rely solely on image processing, the accuracy of these techniques may be less than desired in some tasks involving the automated analysis of web pages.

Text processing techniques may be used for analyzing the text near an image in order to automatically identify certain text information associated with images or elements within the images. Since such techniques typically rely solely on text processing, the accuracy of these techniques may also be less than desired in some tasks involving the automated analysis of web pages.

One implementation is directed to a system and method for the automatic labeling of web images of real people by integrating face recognition with text analysis, and thereby solving the lack of accuracy issues that can arise when one of these techniques are used alone. The system and method according to one implementation combine face clustering and recognition with text analysis, and through an iterative process, automatically identify and label people in images in web page collections. This approach enables automatic semantic labeling and indexing of web images, as well as improves the clustering performance on images of the same person. Through the iterative process, face clustering helps filter named entities identified through the text analysis and determine the identity of the person; and named entities help to find more instances for each face cluster. When this process converges, comprehensive face clusters with determined identities are obtained, resulting in high quality labeling of people in web images. Embodiments disclosed herein have potential applications in automatic labeling and indexing of web images/content, semantic image search, automated publishing, social recommendation, and user profile generation.

Figure 1:
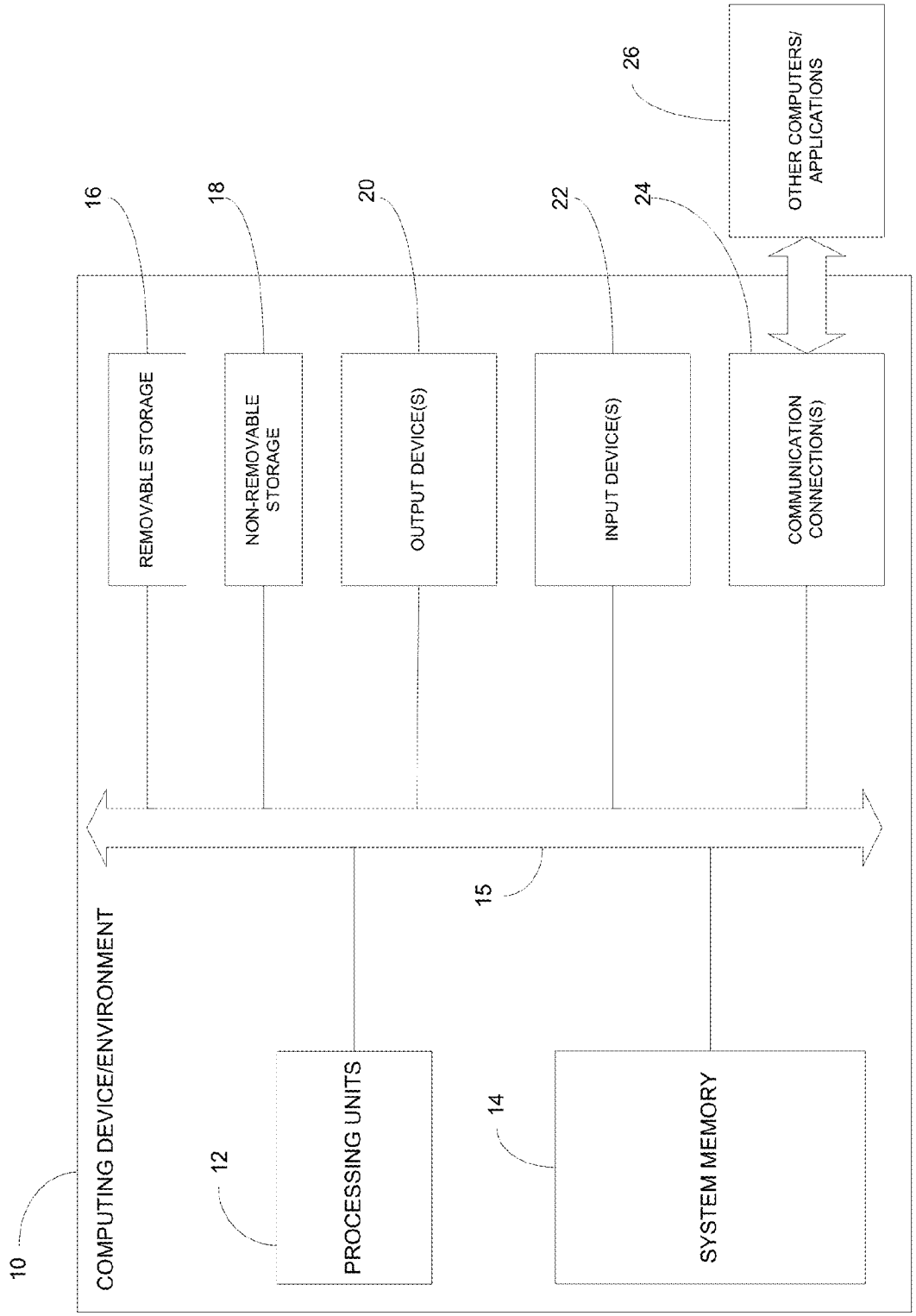
FIG. 1 is a block diagram illustrating a computing environment suitable for implementing aspects of a system for automatic labeling of web images of real people according to one example.

FIG. 1 is a diagram illustrating a computing environment 10 suitable for implementing aspects of a system for automatic labeling of web images of real people according to one example. In the illustrated implementation, the computing system or computing device 10 includes one or more processing units 12 and system memory 14. Depending on the exact configuration and type of computing device, memory 14 may be volatile (such as RAM), non-volatile (such as ROM, flash memory, etc.), or some combination of the two.

Computing device 10 may also have additional features/functionality. For example, computing device 10 may also include additional storage (removable and/or non-removable) including, but not limited to, magnetic or optical disks or tape. Such additional storage is illustrated in FIG. 1 by removable storage 16 and non-removable storage 18. Computer storage media includes volatile and nonvolatile, removable and non-removable media implemented in any suitable method or technology for storage of information such as computer readable instructions, data structures, program modules or other data. Memory 14, removable storage 16 and non-removable storage 18 are all examples of computer storage media (e.g., computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, and magnetic disk storage or other magnetic storage devices. Any such computer storage media may be part of computing device 10.

The various elements of computing device 10 are communicatively coupled together via one or more communication links 15. Computing device 10 also includes one or more communication connections 24 that allow computing device 10 to communicate with other computers/applications 26. Computing device 10 may also include input device(s) 22, such as keyboard, pointing device (e.g., mouse), pen, voice input device, touch input device, etc. Computing device 10 may also include output device(s) 20, such as a display, speakers, printer, etc.

FIG. 1 and the above discussion are intended to provide a brief general description of a suitable computing environment in which one or more embodiments may be implemented. It should be understood, however, that handheld, portable, and other computing devices of all kinds are contemplated for use. FIG. 1 thus illustrates an example of a suitable computing system environment 10 in which the embodiments may be implemented, although as made clear above, the computing system environment 10 is only one example of a suitable computing environment and is not intended to suggest any limitation as to the scope of use or functionality of the embodiments. Neither should the computing environment 10 be interpreted as having any dependency or requirement relating to any one or combination of components illustrated in the exemplary operating environment 10.

Figure 2:
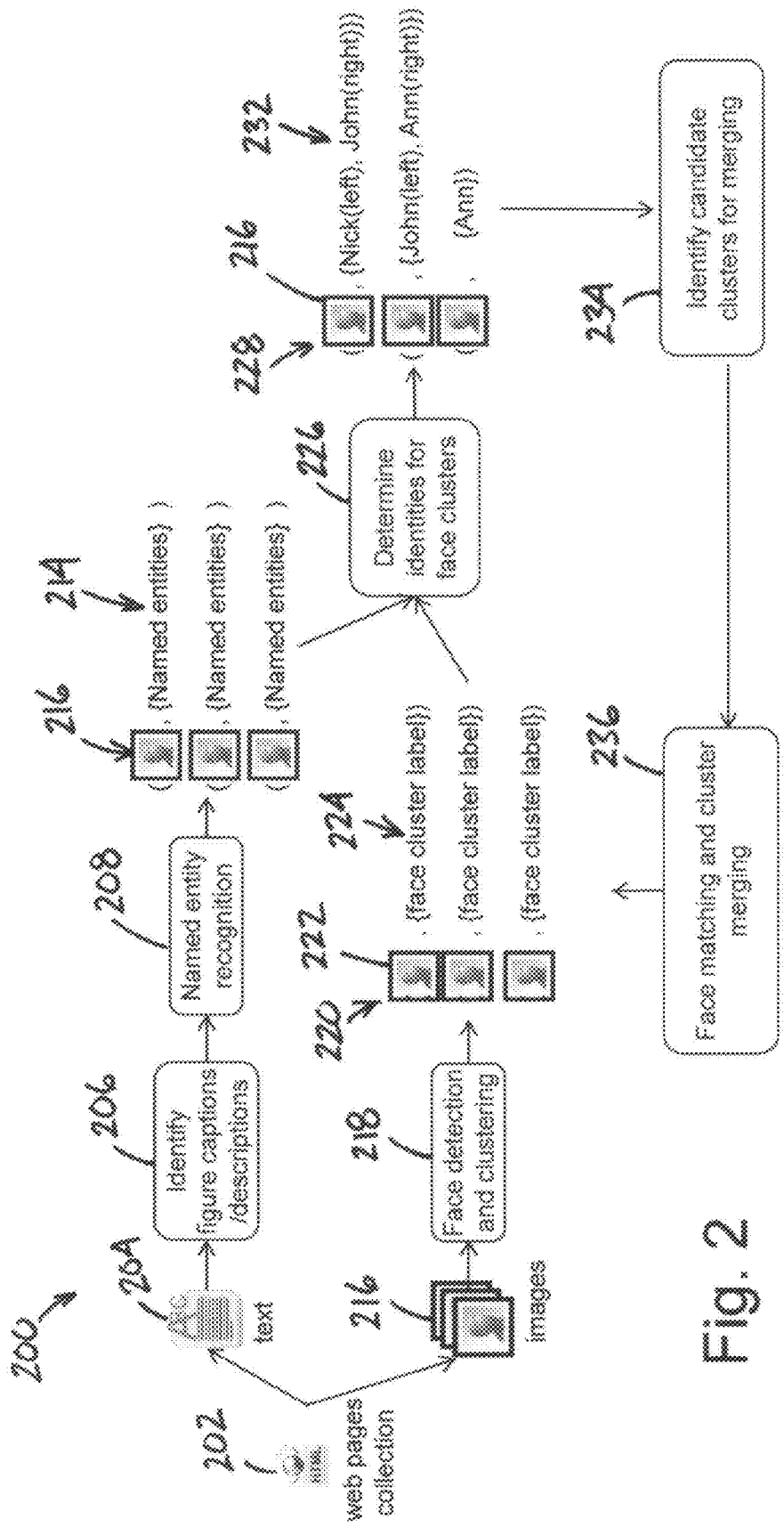
FIG. 2 is a diagram illustrating a method for the automatic labeling of web images of real people by integrating face recognition with text analysis according to one example.

FIG. 2 is a diagram illustrating a method 200 for the automatic labeling of web images of real people by integrating face recognition with text analysis according to one example. In one implementation, computing device 10 (FIG. 1) is configured to perform method 200. Given a collection of web pages 202, method 200 automatically recognizes people in images contained in the web pages 202, and labels the images with the people's identities.

As shown in FIG. 2, images 216 and text 204 are extracted from the web pages 202. At 206, the text 204 is analyzed to identify a set of text (e.g., figure captions, descriptions, and surrounding text content) associated with each image 216. At 218, face detection is applied to each of the images 216. For each image 216 with one or more detected faces, the set of text associated with the image 216 (identified at 206) is analyzed at 208 using a named entity recognition process. The result of this process is the generation of a set of named entities 214 for each of the images 216. FIG. 2 shows three sets of named entities 214, as well as an image 216 associated with each of the named entities 214.

At 218 in method 200, face clustering is applied to all of the detected faces in the images 216. As a result of the face clustering, an initial set of face clusters 220 is generated. FIG. 2 shows three face clusters 220, with each cluster 220 containing a set 222 of one or more images 216 of the same person and an associated face cluster label 224. In one implementation, each face cluster 220 corresponds to a single person and includes images 216 in which that person's face was detected. It is noted that there may be multiple face clusters 220 associated with a single person. The identities of the people appearing in these images 216 are not known yet at this stage of the method 200.

At 226, for each face cluster 220, the sets of named entities 214 associated with the images 216 in the cluster 220 are compared, and the intersection set of the named entity sets 214 for these images 216 is obtained. The intersection set is a refined named entity set, and is used as the label 224 for the face cluster 220. If there are multiple images 216 in a given face cluster 220, the intersection set may well describe the identity of the person associated with that face cluster 220. Theoretically, the larger the face cluster 220, the more specific the intersection set will be, and hence the more accurate the text description (i.e., label 224) will be. For example, the label 224 may be the name of the person (e.g., Barak Obama) and/or other identifying words associated with the person (e.g., President of the United States). If a given face cluster 220 only has one image 216 (i.e., a singular cluster), the cluster's label 224 will be the same as the named entity set 214 associated with that single image 216.

After each cluster 220 obtains a text description (i.e., label 224) at 226, for every pair of clusters 220, the labels 224 of these clusters 220 are compared and if the labels match (e.g., both clusters 220 have "Barak Obama" as the label 224), the two clusters 220 are identified to be candidates for cluster merging at 234. At 236, face matching is conducted between faces in pairs of candidate clusters 220, and when the matching exceeds a specified threshold, the two clusters 220 are merged into one cluster 220, and the method 200 returns to 226 for the next iteration.

In this way, smaller clusters 220 may be merged to form bigger clusters 220. When a cluster 220 gets bigger, the intersection set (determined at 226) of named entities 214 of all its member images 216 will be more specific, and thus a more accurate description of the cluster 220 (and correspondingly the person associated with the cluster 220) will be obtained. This in turn helps further merging of the face clusters.

In one implementation, the iteration between blocks 226, 234, and 236 continues until there is no further cluster merging, and the label 224 of each face cluster 220 is fixed. In this way, images 216 of people in the web page collection 202 are automatically clustered and indexed. Through the iterative process 200, face clustering helps filter named entities 214 identified through the text analysis and determine the identity of the person; and the named entities 214 help to find more instances for each face cluster 220. When this process 200 converges, comprehensive face clusters 220 with labels 224 containing determined identities are obtained, resulting in high quality labeling of people in web images. In one implementation, the final cluster labels 224 are used to generate a set of labeled images 228, with each labeled image 228 including an image 216 and an associated label 232 containing names for each person appearing in the image 216.

Method 200 according to one implementation is not only able to cluster images of the same person, but also name the person. In one implementation, method 200 is automatic and robust to noises in image and text, and increases the recall of face clustering.

Figure 3:
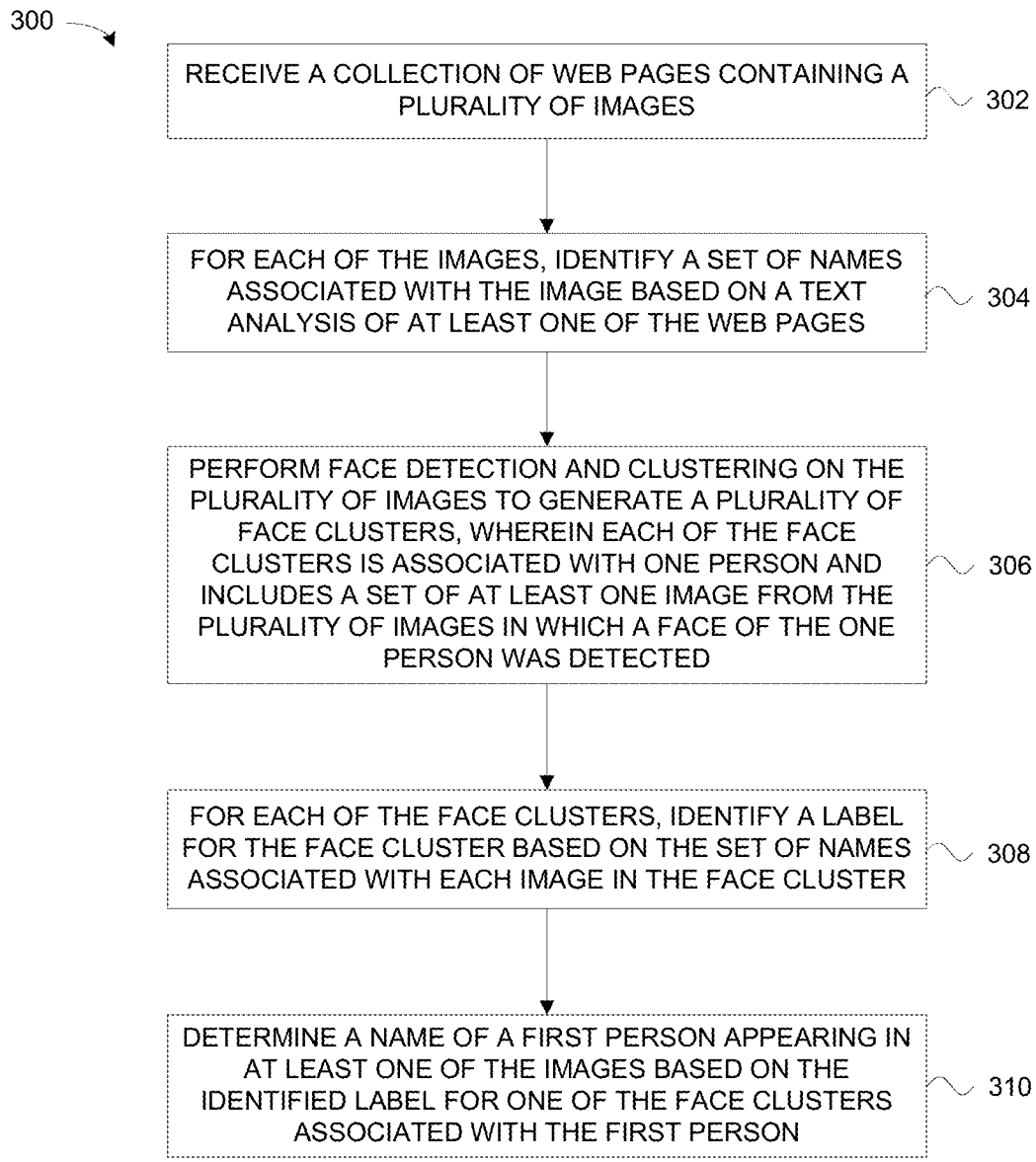
FIG. 3 is a flow diagram illustrating a computer-implemented method of automatically determining a name of a person appearing in an image according to one example.

FIG. 3 is a flow diagram illustrating a computer-implemented method 300 of automatically determining a name of a person appearing in an image according to one example. In one implementation, computing device 10 (FIG. 1) is configured to perform method 300. At 302 in method 300, a collection of web pages containing a plurality of images is received. At 304, for each of the images, a set of names associated with the image is identified based on a text analysis of at least one of the web pages. At 306, face detection and clustering is performed on the plurality of images to generate a plurality of face clusters, wherein each of the face clusters is associated with one person and includes a set of at least one image from the plurality of images in which a face of the one person was detected. At 308, for each of the face clusters, a label for the face cluster is identified based on the set of names associated with each image in the face cluster. At 310, a name of a first person appearing in at least one of the images is determined based on the identified label for one of the face clusters associated with the first person.

Method 300 according to one embodiment further includes, for each of the face clusters, comparing the set of names associated with each image in the face cluster to determine an intersection set of names, wherein the intersection set of names for each face cluster is used as the label for the face cluster.

In one embodiment, method 300 further includes comparing the label for each face cluster to the labels for other ones of the face clusters to identify candidate face clusters for merging. In one form of this embodiment, two of the face clusters are identified as candidate face clusters if the two face clusters have matching labels. Method 300 according to one embodiment further includes performing face matching on faces appearing in images of a pair of the candidate face clusters, and merging the pair of candidate face clusters into a single face cluster if the face matching exceeds a specified threshold.

Method 300 according to one embodiment further includes: identifying candidate face clusters for merging based on the labels for the face clusters; performing face matching on faces appearing in images of the candidate face clusters; and merging selected ones of the candidate face clusters based on results of the face matching, thereby generating an updated set of face clusters. In one form of this embodiment, the method 300 further includes, for each of the face clusters in the updated set, identifying an updated label for the face cluster based on the set of names associated with each image in the face cluster. In one embodiment, method 300 also includes automatically adding the name of the first person to the at least one image in which the first person appears.

Another embodiment is directed to a computer-readable storage medium storing computer-executable instructions that when executed by at least one processor cause the at least one processor to perform a method within a computing system. The method includes receiving a collection of web pages containing a plurality of images, and, for each of the images, identifying a set of names associated with the image based on a text analysis of at least one of the web pages. The method includes generating a plurality of face clusters based on face detection and clustering performed on the plurality of images, wherein each of the face clusters is associated with one person and includes a set of at least one image from the plurality of images in which a face of the one person was detected. The method further includes, for each of the face clusters, identifying a label for the face cluster based on the set of names associated with each image in the face cluster, and determining a name of a first person appearing in at least one of the plurality of images based on the identified label for one of the face clusters associated with the first person.

Yet another embodiment is directed to a system for automatically determining a name of a person appearing in an image. The system includes a memory to store web pages containing a plurality of images, and a processor coupled to the memory to: for each of the images, perform a text analysis of at least one of the web pages to identify a set of names associated with the image; generate a plurality of face clusters by performing face detection and clustering on the plurality of images, wherein each of the face clusters is associated with one person and includes a set of at least one image from the plurality of images in which a face of the one person was detected; for each of the face clusters, identify a label for the face cluster based on the set of names associated with each image in the face cluster; and determine a name of a first person appearing in at least one of the plurality of images based on the identified label for one of the face clusters associated with the first person.

In one form of this embodiment, the processor also, for each of the face clusters, compares the set of names associated with each image in the face cluster to determine an intersection set of names, wherein the intersection set of names for each face cluster is used as the label for the face cluster.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:
1. A computer-implemented method of automatically determining a name of a person appearing in an image, comprising:
receiving a collection of web pages containing a plurality of images;
for each of the images, identifying a set of names associated with the image based on a text analysis of at least one of the web pages;
performing face detection and clustering on the plurality of images to generate a plurality of face clusters, wherein each of the face clusters is associated with one person and includes a set of at least one image from the plurality of images in which a face of the one person was detected;
for each of the face clusters, identifying a label for the face cluster based on the set of names associated with each image in the face cluster;
determining a name of a first person appearing in at least one of the images based on the identified label for one of the face clusters associated with the first person; and
wherein the receiving, identifying a set of names, performing face detection and clustering, identifying a label, and determining a name are performed by at least one processor.

2. The computer-implemented method of claim 1, and further comprising:
for each of the face clusters, comparing the set of names associated with each image in the face cluster to determine an intersection set of names.

3. The computer-implemented method of claim 2, wherein the intersection set of names for each face cluster is used as the label for the face cluster.

4. The computer-implemented method of claim 1, and further comprising:
comparing the label for each face cluster to the labels for other ones of the face clusters to identify candidate face clusters for merging.

5. The computer-implemented method of claim 4, wherein two of the face clusters are identified as candidate face clusters if the two face clusters have matching labels.

6. The computer-implemented method of claim 4, and further comprising:
performing face matching on faces appearing in images of a pair of the candidate face clusters.

7. The computer-implemented method of claim 6, and further comprising:
merging the pair of candidate face clusters into a single face cluster if the face matching exceeds a specified threshold.

8. The computer-implemented method of claim 1, and further comprising:
identifying candidate face clusters for merging based on the labels for the face clusters;
performing face matching on faces appearing in images of the candidate face clusters; and
merging selected ones of the candidate face clusters based on results of the face matching, thereby generating an updated set of face clusters.

9. The computer-implemented method of claim 8, and further comprising:
for each of the face clusters in the updated set, identifying an updated label for the face cluster based on the set of names associated with each image in the face cluster.

10. The computer-implemented method of claim 1, and further comprising:
automatically adding the name of the first person to the at least one image in which the first person appears.

11. A computer-readable storage medium storing computer-executable instructions that when executed by at least one processor cause the at least one processor to perform a method within a computing system, the method comprising:
receiving a collection of web pages containing a plurality of images;
for each of the images, identifying a set of names associated with the image based on a text analysis of at least one of the web pages;
generating a plurality of face clusters based on face detection and clustering performed on the plurality of images, wherein each of the face clusters is associated with one person and includes a set of at least one image from the plurality of images in which a face of the one person was detected;

for each of the face clusters, identifying a label for the face cluster based on the set of names associated with each image in the face cluster; and determining a name of a first person appearing in at least one of the plurality of images based on the identified label for one of the face clusters associated with the first person.

12. The computer-readable storage medium of claim 11, wherein the method further comprises:

for each of the face clusters, determining an intersection set of names based on a comparison of the set of names associated with each image in the face cluster, wherein the intersection set of names for each face cluster is used as the label for the face cluster.

13. The computer-readable storage medium of claim 11, wherein the method further comprises:

identifying candidate face clusters for merging based on a comparison of the label for each face cluster to the labels for other ones of the face clusters.

14. The computer-readable storage medium of claim 13, wherein two of the face clusters are identified as candidate face clusters if the two face clusters have matching labels.

15. The computer-readable storage medium of claim 13, wherein the method further comprises:

performing face matching on faces appearing in images of a pair of the candidate face clusters.

16. The computer-readable storage medium of claim 15, wherein the method further comprises:

merging the pair of candidate face clusters into a single face cluster if the face matching exceeds a specified threshold.

17. The computer-readable storage medium of claim 11, wherein the method further comprises:

identifying candidate face clusters for merging based on the labels for the face clusters;

performing face matching on faces appearing in images of the candidate face clusters; and merging selected ones of the candidate face clusters based on results of the face matching, thereby generating an updated set of face clusters.

18. The computer-readable storage medium of claim 17, wherein the method further comprises:

for each of the face clusters in the updated set, identifying an updated label for the face cluster based on the set of names associated with each image in the face cluster.

19. A system for automatically determining a name of a person appearing in an image, comprising:

a memory to store web pages containing a plurality of images; and a processor coupled to the memory to:

for each of the images, perform a text analysis of at least one of the web pages to identify a set of names associated with the image;

generate a plurality of face clusters by performing face detection and clustering on the plurality of images, wherein each of the face clusters is associated with one person and includes a set of at least one image from the plurality of images in which a face of the one person was detected;

for each of the face clusters, identify a label for the face cluster based on the set of names associated with each image in the face cluster; and determine a name of a first person appearing in at least one of the plurality of images based on the identified label for one of the face clusters associated with the first person.

20. The system of claim 19, wherein the processor:

for each of the face clusters, compares the set of names associated with each image in the face cluster to determine an intersection set of names, wherein the intersection set of names for each face cluster is used as the label for the face cluster.

* * * * *